No. 12,564. REISSUED NOV. 20, 1906.

H. O. CULVER.

HAY LOADER.

APPLICATION FILED FEB. 19, 1906.

Witnesses:
W. H. Cotton
Charles B. Gillson.

Inventor:
Hosea O. Culver.
By Louis F. Giles Atty

THE NORRIS PETERS CO., WASHINGTON, D. C.

UNITED STATES PATENT OFFICE.

HOSEA ORANGE CULVER, OF SANDWICH, ILLINOIS.

HAY-LOADER.

No. 12,564. Specification of Reissued Letters Patent. Reissued Nov. 20, 1906.

Original No. 808,073, dated December 26, 1905. Application for reissue filed February 19, 1906. Serial No. 301,955.

*To all whom it may concern:*

Be it known that I, HOSEA ORANGE CULVER, a citizen of the United States, and a resident of Sandwich, county of Dekalb, and State of Illinois, have invented certain new and useful Improvements in Hay-Loaders, of which the following is a specification and which are illustrated in the accompanying drawings, forming a part thereof.

This invention relates to hay rakes and loaders; and it has for its object to simplify and improve the construction and operation of this class of devices.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention.

Figure 1:
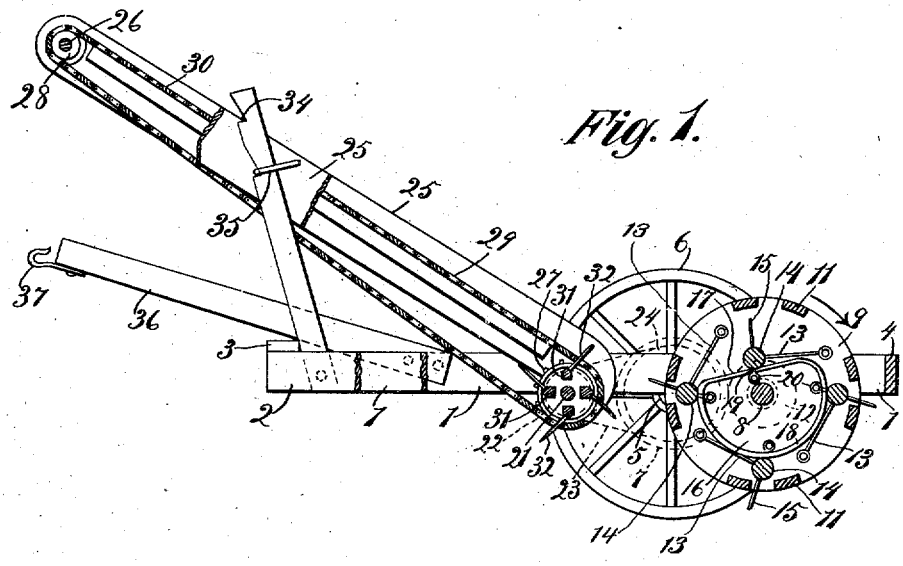
Figure 2:
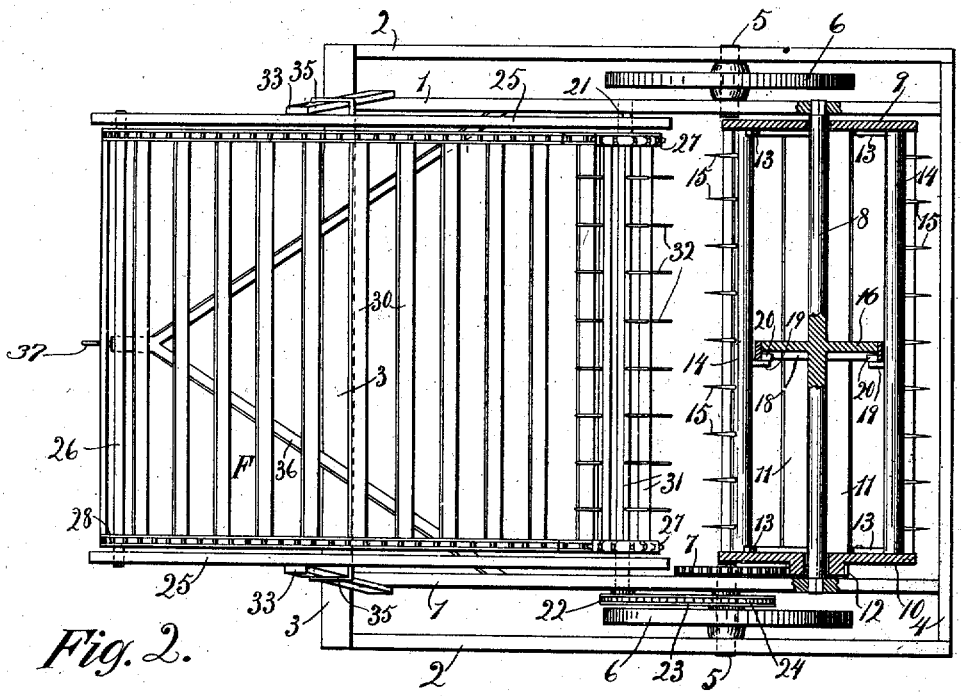

In said drawings, Figure 1 is a sectional elevation of a hay rake and loader constructed in accordance with the principles of the invention. Fig. 2 is a top plan view of the same.

Corresponding parts in both figures are indicated throughout by similar characters of reference.

An approximately rectangular frame is provided including pairs of side members, the inner ones of which are designated 1 1 and the outer ones 2 2, said frame comprising also front and rear cross members 3 and 4, which serve to connect the pairs of side members, as shown. The pairs of side members are provided with bearings in which short axles 5 5 are journaled, said axles being provided between the side members 1 2 with carrying-wheels 6, one of said axles being also provided at its inner end with a spur-wheel 7.

Upon a shaft 8, the ends of which are secured in the inner side members of the frame, is mounted for rotation a reel or rotary rake member including heads 9 and 10, which are connected by means of longitudinal bars or side members 11. One of the heads 10 is provided with an integral pinion 12, meshing with the spur-wheel 7 upon the driven shaft 5. Upon the inner sides of the heads or disks 9 and 10 are pivotally mounted at regular intervals arms 13 13, which are disposed in registry with each other upon the heads or disks. Said arms are connected at their free ends by the rake-bars 14, which are equipped with teeth 15, adapted to extend between the connecting-bars 11 to an earth-engaging position.

The shaft 8 has an intermediate non-circular portion constituting a cam 16, the lower portion of which is preferably concentric with the axis of the shaft, while the upper portion is flattened, as shown at 17. Said cam member is provided with an annular flange 18, constituting a track or guide for guide-pins 19, affixed upon the inner sides of the rake-bars 14 and preferably provided with antifriction-rollers 20. It will be readily seen that by the said cam member the rakes will be guided in such a manner that during a portion of the rotation of the rake cylinder or reel the rake-teeth shall be permitted to protrude between the connecting-bars 11, thus serving to gather the hay and to move the same in a forward direction as the machine progresses, while during the remainder of the revolution of the rake-cylinder the rake-bars will be withdrawn by engaging the upper side of the cam. It is to be understood that, if desired, a plurality of cams, as 16, may be used in order to afford supporting and operating means for the rake-bars and to increase the effectiveness of the operation of the rake.

Supported for rotation in suitable bearings in the inner side members 1 1 of the main frame is a shaft 21, having a sprocket-wheel 22, which is connected by a chain 23 with a sprocket-wheel 24 upon one of the carrying-wheels 6, from which rotary motion is thus transmitted to the shaft 21. Supported loosely or pivotally upon said shaft are the side members 25 of a carrier-frame F, said side members affording bearings at the outer ends thereof for a shaft 26. The shaft 21 is provided with sprockets 27 and the shaft 26 is provided with guide-wheels 28, which latter may be either plain pulleys or sprockets, said sprockets and guide-pulleys being connected by link belts 29, which in turn are connected by transverse slats 30, coöperating with said link belts to constitute an endless carrier. The shaft 21 also supports a reel which is composed of transverse bars 31, connecting the sprockets 27 and provided with outwardly-extending teeth 32, said teeth being preferably extended obliquely from the reel-bars and being tangential to a circle of slightly smaller diameter than that of the reel. The side members 1 1 of the frame are provided with pivoted uprights 33, provided with notches 34, adapted for engagement with staples or keepers 35 upon the side members 25 of the carrier-frame, which latter may be thereby supported at various adjustments.

Suitably connected with the main frame of the machine is a draft-frame consisting of converging side members 36 and including at the front end thereof a hook member 37, whereby it may be connected with the running-gear of a wagon into which hay is to be loaded.

When the machine progresses over the ground, motion is transmitted from the carrying-wheels to the rake-cylinder in the direction of the arrow in Fig. 1, with the result that the rake-teeth protruding between the connecting-bars 11 will drag upon the ground in engagement with the hay, which is thus raked forwardly and elevated by the action of the rakes and rake-cylinder until the tangential teeth 32, extending from the reel-bars 31 and which are preferably located intercurrently with the teeth upon the rake-bars, take up the load and deposit it upon the endless carrier, which is driven in the manner described from one of the carrying-wheels and which serves to elevate the load and to deposit the same upon the wagon which is driven in front. As the rake-bars ascend said bars, which are guided by the cam 16, will fold upon the latter until the rear end of the cam is reached, when the rake-bars will be guided into operative position, as will be readily understood.

The construction of this improved hay rake and loader is very simple, is easily manipulated, and efficient in operation.

Having thus described the invention, what is claimed is—

1. In a machine of the class described, a frame, carrying-wheels for said frame, a stationary shaft supported in the side members of the frame, a rake-cylinder including heads supported for rotation upon said shaft and pairs of bars connecting said heads, arms pivoted upon the inner sides of said heads, and toothed rake-bars connecting said arms; a cam member supported securely upon the shaft in engagement with the rake-bars; and means for transmitting motion from the carrier-wheels to the rake-cylinder to rotate the cylinder reversely to the carrier-wheels.

2. In a machine of the class described, in combination, a wheeled frame, a shaft fixed in the frame, a cam rigidly mounted on the shaft, a pair of cylinder-heads rotatably mounted on the shaft, an arm pivotally attached to each of the cylinder-heads, and a rake uniting the free ends of such arms and riding on the cam.

3. In a machine of the class described, a frame, carrying-wheels for said frame, a stationary shaft supported in the side members of the frame, a rake-cylinder including heads supported for rotation upon said shaft, arms pivoted upon the inner sides of said heads, and toothed rake-bars connecting said arms; a cam member supported securely upon the shaft in engagement with the rake-bars; and means for transmitting motion from the carrier-wheels to the rake-cylinder to rotate the cylinder reversely to the carrier-wheels.

HOSEA ORANGE CULVER.

Witnesses:
LOUIS K. GILLSON.
CHARLES B. GILLSON.